(12) United States Patent
Lucey et al.

(10) Patent No.: US 9,740,984 B2
(45) Date of Patent: Aug. 22, 2017

(54) CHARACTERIZING MOTION PATTERNS OF ONE OR MORE AGENTS FROM SPATIOTEMPORAL DATA

(75) Inventors: Patrick Lucey, Pittsburgh, PA (US); Alina Bialkowski, Sinnamon Park (AU); Iain Matthews, Pittsburgh, PA (US); G. Peter Carr, Pittsburgh, PA (US); Eric Foote, Swissvale, PA (US)

(73) Assignee: Disney Enterprises, Inc., Burbank, CA (US)

( * ) Notice: Subject to any disclaimer, the term of this patent is extended or adjusted under 35 U.S.C. 154(b) by 83 days.

(21) Appl. No.: 13/591,079

(22) Filed: Aug. 21, 2012

(65) Prior Publication Data

US 2014/0058992 A1 Feb. 27, 2014

(51) Int. Cl.
*G06F 15/00* (2006.01)
*G06F 15/18* (2006.01)
*G06N 5/04* (2006.01)

(52) U.S. Cl.
CPC .................................. *G06N 5/043* (2013.01)

(58) Field of Classification Search
CPC . G01S 3/7864; G01S 5/02; G06K 2009/2045; G06K 9/209; G06K 2009/3291; G06K 9/00724; G06T 2207/10016; G06T 2207/10021; G06T 2207/10024; G06F 17/18; G06F 17/30061; G06F 17/30064; G06F 15/00; G06F 15/18; H04N 5/272; H04N 5/2723; A63B 71/06; A63B 2220/806; A63B 2243/0025; A63B 71/0605; A63B 2024/0025; A63B 2220/40; A63B 2220/53; A63B 2220/836;
(Continued)

(56) References Cited

U.S. PATENT DOCUMENTS 5,412,188 A * 5/1995 Metz ...................... G06F 17/18
235/375
2007/0279494 A1* 12/2007 Aman et al. ................. 348/169
(Continued)

OTHER PUBLICATIONS

'Motion Fields to Predict Play Evolution in Dynamic Sport Scenes': Kim, 2010, IEEE, 978-1-4244-6985.*
(Continued)

*Primary Examiner* — Stanley K Hill
*Assistant Examiner* — Peter Coughlan
(74) *Attorney, Agent, or Firm* — Patterson + Sheridan, LLP

(57) ABSTRACT

Techniques are described to characterize motion patterns of a group of agents engaging in an activity. An analysis system receives input data associated with spatial and temporal information of at least one element of interest associated with the activity, where the object of interest may be a ball, person, animal or any other object in motion. The analysis system partitions the input data into a plurality of spatiotemporal segments and generates one or more representations of one or more sets of segments of the plurality of spatiotemporal segments based on one or more criteria. The analysis system computes a metric, such as an entropy value, for each of the one or more representations. Partial tracing data, such as ball movements in a sporting event, may be created using an inexpensive input device, such as a tablet computer, making the disclosed techniques available for a wide range of events and activities.

20 Claims, 9 Drawing Sheets
(6 of 9 Drawing Sheet(s) Filed in Color)

(58) Field of Classification Search
CPC ........... A63B 2225/50; G09G 2340/12; G09G 2340/125; G09G 5/14
USPC .......................................................... 706/62
See application file for complete search history.

(56) References Cited

U.S. PATENT DOCUMENTS

| | | | | |
|---|---|---|---|---|
| 2008/0312010 | A1* | 12/2008 | Marty et al. .................. | 473/447 |
| 2009/0231198 | A1* | 9/2009 | Walsh ................ | A63B 24/0021 342/463 |
| 2010/0026809 | A1* | 2/2010 | Curry ............................ | 348/157 |
| 2011/0090344 | A1* | 4/2011 | Gefen ..................... | G06T 7/204 348/169 |
| 2011/0156868 | A1* | 6/2011 | Hoeflinger ......... | A63B 24/0021 340/8.1 |
| 2011/0304497 | A1* | 12/2011 | Molyneux et al. ............. | 342/42 |
| 2012/0029666 | A1* | 2/2012 | Crowley ............ | A63B 24/0062 700/91 |

OTHER PUBLICATIONS

'A Trajectory-Based Analysis of Coordinated Team Activity in Basketball Game': Perse, 2008, Computer vision and image understanding.*
'Automatic Detection and Analysis of Player Action n Moving Background Sports Video Sequences': Li, 2010, IEEE, 1051-8215, pp. 351-364.*
'Characterizing Multi-Agent Team Behavior from Partial Team Tracings: Evidence from the English Premier League': Lucey, 2012, Proceedings of the Twenty-Sixth AAAI Conference on Artificial Intelligence, pp. 1387-1393.*
Allen, Nicholas D. et al., StatsMonkey: A Data-Driven Sports Narrative Writer, Computational Models of Narrative: AAAI Fall Symposium Series 2 (2010), 2 pages.
Banerjee, Bikramjit et al., Multi-Agent Plan Recognition: Formalization and Algorithms, Proceedings of the Twenty-Fourth AAII Conference on Artificial Intelligence 1059 (2010), 6 pages.
Beetz, Michael et al., ASPOGAMO: Automated Sports Game Analysis Models, International Journal of Computer Science in Sport 8(1), (2009), 21 pages.
Cohen, Philip R. & Levesque, Hector J., Intention is Choice with Commitment, 42 Artificial Intelligence 213 (1990), 49 pages.
Hess, Rob & Fern, Alan, Discriminatively Trained Particle Filters for Complex Multi-Object Tracking, IEEE Computer Society Conference on Computer Vision and Pattern Recognition (2009), 8 pages.
Hess, Rob et al., Mixture-of-Parts Pictorial Structures for Objects with Variable Part Sets, Eleventh IEEE International Conference on Computer Vision (2007), 8 pages.
Intille, Stephen S. & Bobick, Aaron F., A Framework for Recognizing Multi-Agent Action from Visual Evidence, Proceedings of the AAII (1999), 8 pages.
Kim, Kihwan et al., Motion Fields to Predict Play Evolution in Dynamic Sports Scenes, Proceedings of the Twenty-Third IEEE Computer Society Conference on Computer Vision and Pattern Recognition 840 (2010), 8 pages.
Laviers, Kennard et al., Improving Offensive Performance through Opponent Modeling, Proceedings of the Fifth Artificial Intelligence for Interactive Digital Entertainment Conference 58 (2009), 6 pages.

Li, Ruonan & Chellappa, Rama, Group Motion Segmentation Using a Spatio-Temporal Driving Force Model, Proceedings of the Twenty-Third Computer Society Conference on Computer Vision and Pattern Recognition (2010), 8 pages.
Li, Chu Min et al., Exploiting Cycle Structures in MAX-SAT, International Conference on Theory and Applications of Satisfiability Testing (2009), 14 pages.
Li, Ruonan, et al., Learning Multi-Modal Densities on Discriminative Temporal Interaction Manifold for Group Activity Recognition, IEEE Computer Society Conference on Computer Vision and Pattern Recognition (2009), 8 pages.
Lucey, Patrick, et al., Characterizing Multi-Agent Team Behavior from Partial Team Tracings: Evidence from the English Premier League, Proceedings of the Twenty-Sixth AAII Conference on Artificial Intelligence 1387 (2012), 7 pages.
Perse, Matej, et al., A Trajectory-Based Analysis of Coordinated Team Activity in Basketball Game, Computer Vision and Image Understanding (2008), 30 pages.
Riley, Patrick & Veloso, Manuela, Recognizing Probabilistic Opponent Movement Models, in RoboCup 2001: Robot Soccer World Cup V 453, Noske, Rainer P.S. et al., eds., Springer Verlag. (2002), 6 pages.
Sadilek, Adam & Kautz, Henry, Recognizing Multi-Agent Activities from GPS Data, Proceedings of the Twenty-Fourth AAII Conference on Artificial Intelligence 1134 (2010), 6 pages.
Shannon, C.E., A Mathematical Theory of Communication, 5:1 Mobile Computing and Communication Review 3, Reprinted for the Bell System Technical Journal 28 (1948), 53 pages.
Siddiquie, Behjat, et al., Recognizing Plays in American Football Videos, Technical report, University of Maryland (2009), 8 pages.
Stracuzzi, David J., et al., An Application of Transfer to American Football: From Observation of Raw Video to Control in a Simulated Environment, AI Magazine 32(2) (2011), 15 pages.
Sukthankar, Gita &Sycara, Katia, Hypothesis Pruning and Ranking for Large Plan Recognition Problems, Proceedings of the Twenty-Third AAII Conference on Artificial Intelligence 998 (2008), 6 pages.
Sukthankar, Gita & Sycara, Katia, Activity Recognition for Dynamic Multi-Agent Teams, 3:1 ACM Transactions on Intelligent Systems and Technology art. 18 (2012), 24 pages.
IBM Scoring Options—Scores and Stats—Australian Open Tennis Championships 2012—Official Site by IBM, http://www.australianopen.com/en_AU/ibmrealtime/index.html, last visited Nov. 26, 2012.
StatSheet.com: The ultimate source for college basketball, college football, NFL, MLB, and NBA, http://statsheet.com/, last visited Nov. 26, 2012.
Man Utd 2-0 Arsenal: United counter excellently | Zonal Marking, http://www.zonalmarking.net/2011/03/12/man-utd-2-0-arsenal-%20tactics/, last visited Nov. 26, 2012.
Hervieu, A., and Bouthemy, P. 2010. Understanding sports video using players trajectories. In Zhang, J.; Shao, L.; Zhang, L.; and Jones, G., eds., Intelligent Video Event Analysis and Understanding. Springer Berlin / Heidelberg, pp. 125-153.
Dorit Avrahami-Zilberbrand et al. "Towards Dynamic Tracking of Multi-Agents Teams: An Initial Report" 2007, Association for the Advancement of Artificial Intelligence (www.aaai.org). pp. 17-22.
Hankz Hankui Zhou et al. "Multi-Agent Plan Recognition with Partial Team Traces and Plan Libraries" 2011, Proceedings of the Twenty-Second International Joint Conference on Artificial Intelligence. pp. 484-489.

* cited by examiner

CHARACTERIZING MOTION PATTERNS OF ONE OR MORE AGENTS FROM SPATIOTEMPORAL DATA

BACKGROUND

Field of the Invention

The present invention relates to artificial intelligence systems used to analyze participants engaged in a sport and, in particular, to characterizing motion patterns of one or more agents from spatiotemporal data.

Description of the Related Art

Automated systems have been deployed that can analyze the plan and tactics of players of certain sports, e.g., tennis. In such cases, a state of the game is updated regularly at short time intervals, such as when a point is scored. Over time, such a system may build a library of successful plans (resulting in winning a point) and unsuccessful plans (resulting in losing a point or losing service) for a specific player. Such a system may then identify a set of proven plans or tactics from the library that characterize a player, given the relative strengths and weaknesses of the player's plans.

One shortcoming is that these systems rely on the game being segmented into short discretized plays, such as the points of a tennis match. However, some sporting events or activities, such as soccer matches and hockey games, proceed in a low-scoring, continuous fashion, without an easy way to segment play into short, identifiable, discrete segments such as points or plays. In such cases, the system has difficulty in building a library of successful and unsuccessful plans that characterize a player's or team's behavior.

An additional issue for such systems is that tracking data may not be available for each player or participant, particularly for team sports with multiple players or agents on each team. Because player tracking data is costly and difficult to obtain, only partial team tracing data may be available, often in the form of ball tracking. However, player movement data may not be available.

SUMMARY

One embodiment of the present invention includes a method for characterizing team behaviors for sporting events or activities using partial tracking data such as player (agent) tracking data tied to ball actions. The method includes receiving input data associated with spatial and temporal information of at least one element of interest associated with the activity and partitioning the input data into a plurality of spatiotemporal segments. The method further includes generating one or more representations of one or more sets of segments of the plurality of spatiotemporal segments based on one or more criteria. The method further includes computing a metric for each of the one or more representations.

One embodiment of the present invention includes a method for characterizing the motion patterns of a first group of one or more agents engaging in an activity. The method includes receiving input data associated with spatial and temporal information of at least one element of interest associated with the activity, and partitioning the input data into a plurality of spatiotemporal segments. The method further includes generating one or more representations of one or more sets of segments based on pre-determined criteria, and computing a metric for each of the one or more representations.

Other embodiments include, without limitation, a computer-readable storage medium that includes instructions that enable a processing unit to implement one or more aspects of the disclosed methods as well as a computing system configured to implement one or more aspects of the disclosed methods.

In one aspect, player or team behaviors are recognized and characterized for low-scoring and continuous sports, where there is neither a pre-existing plan library, nor a means or set of labels to form such a plan library. Partial team tracing data, such as ball-action data, may allow an analysis system to use currently available tracking data, such as data manually annotated by humans or machine generated by tracking systems. In one embodiment, a low-cost input device, such as a tablet computer, may be used to enter tracking data, allowing the system to be deployed for sports at the amateur and semi-professional level as well as the professional level.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
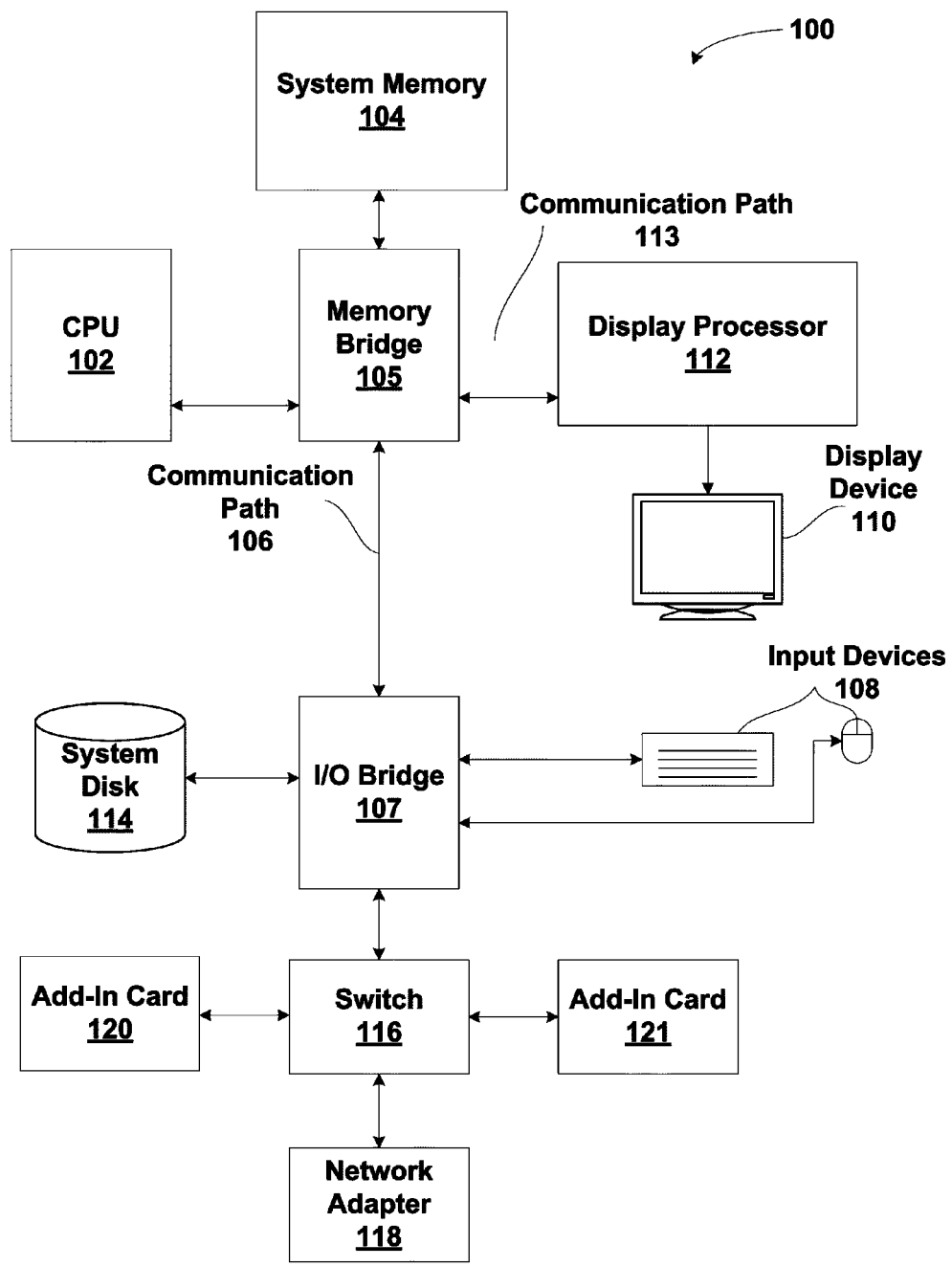
FIG. 1 is a diagram of a computing system that may be configured to implement one or more aspects of embodiments of the present invention.

Embodiments of the invention include a method for characterizing team behaviors for a variety of team sports (e.g., soccer) using partial team tracings such as ball actions. Generally, ball actions refer to any events or actions that occur around the ball (or other object of game play). Rather than use a pre-defined library of labeled plans, team behavior is represented via play segments, i.e., represented via spatiotemporal descriptions of ball movement over fixed windows of time. As such, labeled plan libraries and full team tracings are unnecessary for characterizing important team behaviors. Ball movements may be calculated or inferred from an existing annotated ball action dataset, as is currently used for certain visualizations in sports production. In one embodiment, the annotated ball action data may be entered manually by humans or machine generated by tracking systems. Using the play segment representations, team behavior may be characterized via entropy maps, which measure the predictability of team behaviors across the field.

Multi-agent plan recognition (MAPR) constitutes a method to provide player and team analysis for team sports by finding patterns and styles of play in a large dataset. Given a sequence of observed team behaviors or activities, MAPR seeks to map these behaviors or activities to one distinct plan within a library of plans. A set of these recognized plans may then be used to infer the tactics employed by an agent team in adversarial domains.

In the present context, team may be defined as a set of agents having a shared objective, a shared mental state, and governing rules. Typically, each agent is assigned to one team, although the techniques disclosed herein may be adapted for governing rules where team composition may change during game play. Typically, however, unless an agent has been dismissed from the match or game, each team has the same number of agents throughout the match or game. Team behaviors refer to short, observable segments of coordinated movement and action executed by a team, e.g., a pass from agent A to agent B. These behaviors may be observed from partial spatiotemporal tracings such as ball movement inferred from hand annotated ball-action data. A plan may define an ordered sequence of team behaviors describing actions used by a team to achieve a goal, e.g., scoring a point, taking a ball from an opposing team, or preventing an opposing team from scoring a point (i.e., preventing an opposing team from achieving a goal). A team performing a group of these plans to achieve a major goal, such as winning a match or game, may be said to be employing tactics.

Certain sports, such as soccer, are low-scoring, continuous and complex due to various multi-agent interactions. As a result, labeling and segmenting the game into a series of plans may be difficult and recognizing team tactics using the MAPR framework described above is difficult without these labeled plans. To overcome this issue, a match may be quantized into temporal groups of equal duration which are then used to describe team behavior. As these segments do not describe a method of achieving a specific goal, the segments may be identified as "play segments" rather than plans. Such play segments may be used to form a library or playbook of play segments $P=\{p_1, p_2, p_3, \ldots p_m\}$, where m is the number of unique play segments within the playbook.

As further described below, such play segments may be extracted from partial team tracings, such as ball tracing data, derived from one or more prior matches. The play segments may then be used to form entropy maps that characterize a team's behavior from various positions on the field. These entropy maps may be further analyzed in various ways, including, e.g., to determine whether a team's playing behavior during a particular match is consistent with behavior during prior matches, to determine whether a team's playing behavior varies depending on which team is on the opposing side, or to determine whether a team's behavior is influenced by the coaching staff or one or more specific key players.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As one skilled in the art will appreciate, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and block diagrams of methods, apparatus (systems) and computer program products according to embodiments of the invention. It will be understood that each block of the flowchart illustrations and block diagrams, and combinations of blocks in the flowchart illustrations and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and block diagram block or blocks.

Hardware Overview

FIG. 1 is a diagram of a computing system 100 that may be configured to implement one or more aspects of embodiments of the present invention. The computing system 100 may be any type of computing system including, without limitation, a desktop computer, a laptop computer, a server machine, a set-top box, a game system or console, a mobile device such as a personal digital assistant or a cellular phone.

As shown, the computing system 100 includes a central processing unit (CPU) 102 and a system memory 104 communicating via a bus path that may include a memory bridge 105. CPU 102 includes one or more processing cores, and, in operation, CPU 102 is the master processor of the computing system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and microphones) and forwards the input to CPU 102 via memory bridge 105.

A display processor 112 is coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows the computing system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and data representing a scene are provided to a render farm or a set of server computers, each similar to the computing system 100, via network adapter 118 or system disk 114. The render farm generates one or more rendered images of the scene using the provided instructions and data. These rendered images may be stored on computer-readable media in a digital format and optionally returned to the computing system 100 for display. Similarly, stereo image pairs processed by display processor 112 may be output to other systems for display, stored in system disk 114, or stored on computer-readable media in a digital format.

Alternatively, CPU 102 provides display processor 112 with data and instructions defining the desired output images, from which display processor 112 generates the pixel data of one or more output images, including characterizing and adjusting the offset between stereo image pairs. The data and instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Play Segment Representation

Figure 2:
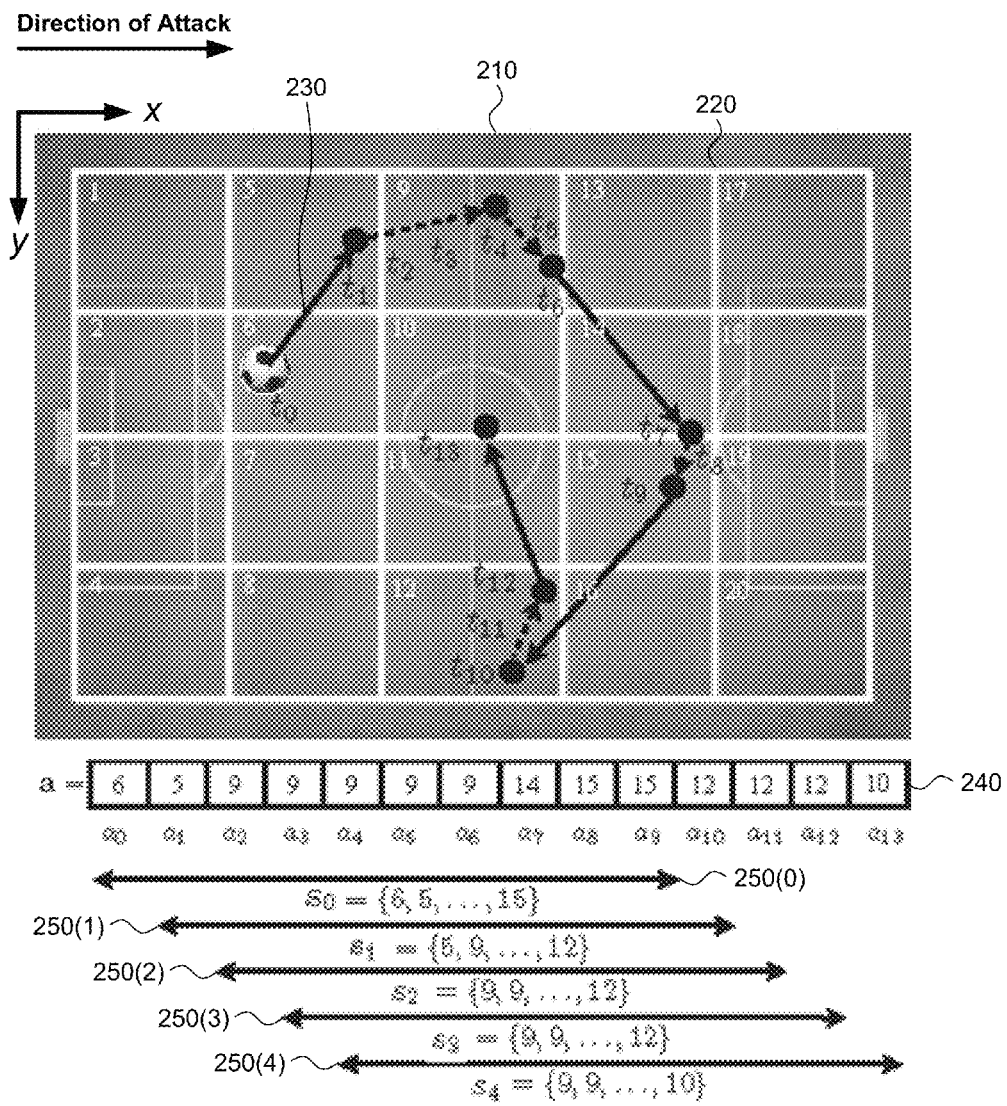
FIG. 2 illustrates a series of ball actions that have been grouped into a series of play segments, according to one embodiment of the present invention.

FIG. 2 illustrates a series of ball actions that have been grouped into a series of play segments, according to one embodiment of the present invention. As shown, the illustration includes a soccer field 210, a grid 220, a ball position path 230, a possession string 240, and play segments 250.

The soccer field 210 illustrates the playing field for a typical soccer match. The ball and players move within the soccer field during the course of a match.

The grid 220 divides the soccer field 210 into sections that may be used to aid in tracking ball actions or player movements. The field may be quantized into a grid of size l×w and number the sections in column order.

As shown, the grid 220 divides the soccer field 210 into twenty sections (numbered 1-20), including five columns (w=5) oriented in the horizontal (x) direction and four rows (l=4) oriented in the vertical (y) direction. In one example, the ball position tracking data could be based on a normalized field of size 100×100 units, where coordinate (0, 0) could represent the upper left-hand corner of section 1, and coordinate (100, 100) could represent the lower-right hand corner of section 20. As such, each section could extend 20 units in the x direction and 25 units in the y direction. In addition, the ball position tracking data could be normalized such that positions are specified for teams attacking from left to right. Such a convention facilitates comparison of ball position throughout a given match and across multiple matches.

The ball position path 230 illustrates the path of the soccer ball for a given span of time during a soccer match. As shown, the position of the ball is shown for fourteen distinct points of time, labeled $t_0$-$t_{13}$, where the time intervals between any pair of adjacent points are equal. These ball positions are known or inferred from ball position data that may be automatically generated or manually collected manually via human annotators who label all actions that occur around the ball. Such actions are called ball actions.

Table 1, below, illustrates a set of annotated ball actions corresponding to the ball position path 230 of FIG. 2:

TABLE 1

| | |
|---|---|
| 1 | <Event event=""pass" time="114" team_id="4" outcome="1" x="20.2" y="64.0"> |
| 2 | <Q qualifier_id="endx" value="35.6" /> |
| 3 | <Q qualifier_id="endy" value="87.3" /> |
| 4 | </Event> |
| 5 | <Event event="takeon" time="118" team_id="4" outcome="1" x="51.2" y="84.1"> |
| 6 | </Event> |
| 7 | <Event event="tackle" time="118" team_id="6" outcome="0" x="48.8" y="15.9"> |

TABLE 1-continued

| | |
|---|---|
| 8 | </Event> |
| 9 | <Event event="pass" time="120" team_id="4" outcome="1" x="59.2" y="76.7"> |
| 10 | <Q qualifier_id="endx" value="79.6" /> |
| 11 | <Q qualifier_id="endy" value="54.3" /> |
| 12 | </Event> |
| 13 | <Event event="pass" time="123" team_id="4" outcome="1" x="75.2" y="46.8"> |
| 14 | <Q qualifier_id="endx" value="55.2" /> |
| 15 | <Q qualifier_id="endy" value="5.3" /> |
| 16 | </Event> |
| 17 | <Event event="pass" time="125" team_id="4" outcome="1" x="61.8" y="15.2"> |
| 18 | <Q qualifier_id="endx" value="51.1" /> |
| 19 | <Q qualifier_id="endy" value="50.9" /> |
| 20 | </Event> |

In the example of Table 1, six ball actions, annotated as "events," are presented, where each ball action includes, the event type (event), time (time), team identification (team_id), outcome (outcome), and ball position (x, y) associated with the ball action. A pass event additionally includes a final ball position (endx, endy). Such ball action data may be used to determine the position of the ball and which team has possession of the ball at every time step during the match. In this example, the time step could be deemed to be one second, but the time step could be any feasible duration. Using the ball position data of Table 1, the ball position may be inferred for each time step.

The first ball action is depicted in lines 1-4 of Table 1. This ball action was a pass event occurring at time 114 executed by a team identified as team 4. The pass was successful as indicated by an outcome of '1.' The ball position at the start of the pass was (20.2, 64.0), shown as $t_0$ in FIG. 2. The final ball position at the completion of the pass was (35.6, 87.3), shown as $t_1$ in FIG. 2. As no time is given for the arrival time of the pass, the pass could be deemed to have taken one second. As such, the time value $t_1$=115.

The second ball action is depicted in lines 5-6 of Table 1. This ball action indicates a team 4 player took on an opposing team player at time 118. The take on occurred at position (51.2, 84.1), shown as $t_4$ in FIG. 2.

The third ball action is depicted in lines 7-8 of Table 1. As shown, a player from team 6 attempted to execute a tackle at a position of (48.8, 15.9) at the same time of the take on (time=118). So in this example, even though the take on and the tackle occurred at the same time, the position relative to each team differs. The tackle was unsuccessful (outcome=0).

The ball position data of Table 1 has no event entry showing the ball position from time $t_1$=115 to time $t_4$=118. During this time, the ball position moved from (35.6, 87.3) to (51.2, 84.1).

From these two ball positions and times ($t_1$-$t_4$), the ball position for intervening time steps may be inferred using any technically feasible approach. For example, because team 4 had possession of the ball at time $t_1$=115 and time $t_4$=118, the ball could be inferred to be in the possession of team 4 between these two times. Further, the ball location at $t_2$=116 and $t_3$=117 could be inferred by assuming that a player from team 4 dribbled the ball in a straight line and at a uniform speed. Given such an assumption, linear interpolation could be used to determine the ball position for time steps not given in Table 1.

Likewise, the fourth ball action, depicted in lines 9-12 of Table 1, indicates a pass from $t_6$=120 and time $t_7$=121. The fifth ball action, depicted in lines 13-16, indicates a pass from $t_9=123$ and time $t_{10}=124$. The sixth ball action, depicted in lines 17-20 of Table 1, indicates a pass from $t_{12}=125$ and time $t_{13}=126$. Ball positions for intervening times may be determined as described above. Ball positions and passes shown in Table 1 are depicted in FIG. 2 as solid circles and lines respectively. Inferred ball paths are depicted in FIG. 2 as dashed lines.

The possession string 240 is an array indicating the section numbers corresponding to the ball position at each time step based on the ball position path 230. Given the observed partial spatiotemporal tracings in a game, O={A, B}, the ball position data for each team may be partitioned into possession strings, where a possession string is a continuous movement of the ball for a single team without turnover or stoppage. A represents the set of possession strings for the first team (team 4 in this example), and B represents the set of possession strings for the second team (team 6 in this example). As such, $A=\{a_0, \ldots, a_{I-1}\}$ and $B=\{b_0, \ldots, b_{J-1}\}$ refer to the possession strings associated with each team and I and J are the number of possessions for teams A and B respectively. The possession strings vary in length according to the actual time of possession until turnover or stoppage. The ball position at each time step of the possession string is converted to a section number of the grid 220, and the resulting section numbers are stored in corresponding positions within the possession string.

The play segments 250 are subsets of possession strings 240, where each play segment 250 has a fixed, pre-determined duration. Because the possession strings 240 vary in length, a sliding window of length T is applied to each possession string to quantize or group the possessions into play segments 250 $S=\{s_0, \ldots s_{N-1}\}$ of equal length, where N is the total number of play segments for a possession. For a given possession string 240 of length T1, the resulting number N of play segments 250 for the possession string may be given as $N=(T1-T)+1$. In one embodiment, if the duration of possession string T1 is shorter than the duration of the sliding window T, then the possession string may be discarded, resulting in no play segments 250 corresponding to the given possession string 240. The duration of the sliding window T and the duration of each time step may be any feasible value. In the example shown in FIG. 2, the duration of the sliding window is 10 and the duration of each time step is 1 second, resulting in play segments 250 of 10 second duration.

To represent each play segment 250 $p=\{p_0, \ldots, p_{T-1}\}$, the ball position at each time step of the sliding window is transferred from the possession string 240 to the corresponding position of the play segment 250. As shown, the possession string 240 $a=\{a_0, \ldots, a_{13}\}$ is populated with the section number corresponding to the ball position at each time step of the possession. Given a possession string 240 of length T1=14, and a play segment 250 duration of T=10, the possession string 240 results in $N=(T1-T)+1=(14-10)+1=5$ play segments 250(0)-250(4).

This process may be repeated for all possession strings 240 for each team, resulting in a set of play segments 250 for each team. The play segments 250 for a given team may then be analyzed in order to characterize the team's behavior under a specific set of conditions. One technique to perform such an analysis is to create an entropy map for each team.

Spatiotemporal Property Maps

Figure 3:
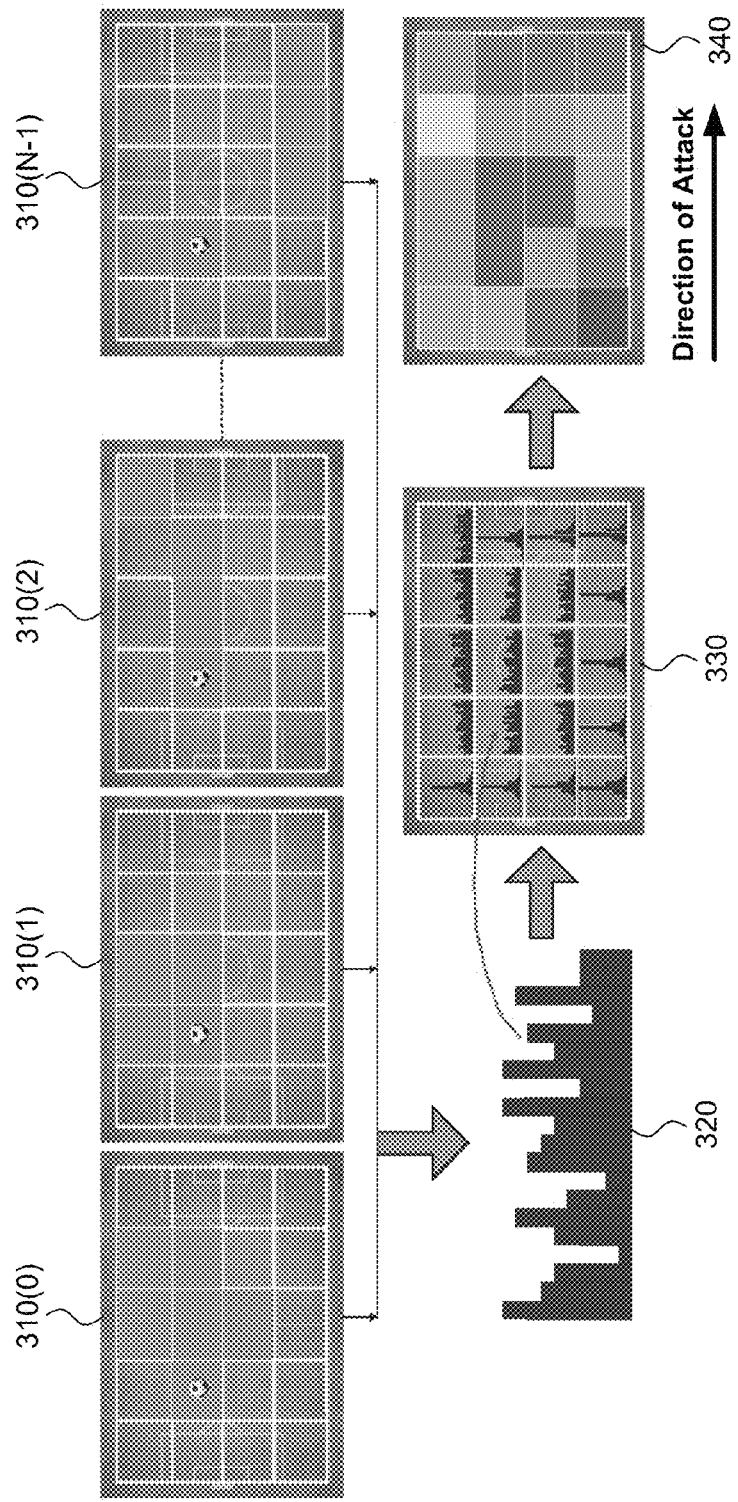
FIG. 3 is a diagram illustrating the creation of an entropy map, according to one embodiment of the present invention.

FIG. 3 is a diagram illustrating the creation of an entropy map, according to one embodiment of the present invention. As shown, the diagram includes play segment graphs 310, a histogram 320, a histogram map 330, and an entropy map 340.

The play segment graphs 310 depict a set of play segments where the ball position is in a particular section of the grid 220 at the beginning of each play segment within the set of play segments. In this example, play segments are initially sorted by starting position of the ball. The play segments are then assigned to each section of the grid 220 according to the starting position. Play segments with an initial ball position of section 1 are assigned to section 1, play segments with an initial ball position of section 2 are assigned to section 2, and so on. As a result, sets of play segments, $S'=\{S_1, \ldots, S_{l \times w}\}$ are determined, where each set corresponds to the starting position of the ball, and where the indices 1 through (l×w) refer to the section numbers of the grid 220. The play segment graphs 310(0)-310(N−1) depict corresponding ball positions for N play segments.

Given the observations of a team, the set of play segments $S_6=\{s_0, \ldots s_{N-1}\}$ may be determined for play segments starting in a section 6. As shown, the play segment graphs correspond to play segments where the ball was in section 6 (the second row of the second column) at the beginning of the play segment. Play segment graph 310(0) indicates that the ball was in sections 6, 9, 10, 11, 13, and 14 during the corresponding play segment. Play segment graph 310(1) indicates that the ball was in sections 5, 6, 9, and 10 during the corresponding play segment. From these play segment graphs 310, the starting position of the ball and the set of sections through which the ball travelled over the duration of the play segment may be determined.

Histogram 320 is a probability distribution depicting the number of times the ball appears in each section of the grid for a set of play segments, where the ball was in section 6 of the grid 220 at the beginning of each of the play segments in the set. Histogram 320 may be created using a variety of techniques. In one example, histogram 320 could record the number of times the ball was in a given section at the end of a play segment, when the ball started in section 6 of the grid 220. In another example, histogram 320 could record the number of times the ball traveled into or through a given section at any time during a play segment, when the ball started in section 6 of the grid 220. Each column within the histogram 320 may correspond to a section of the grid 220, where the height of the first column of the histogram may indicate the number of times the ball travelled through section 1, the height of the second column of the histogram may indicate the number of times the ball travelled through section 2, and so on. The probability "p(i)" that the ball passes through a given section 'i' may be calculated as the ratio of the height of the corresponding column of the histogram to the combined heights of all columns of the histogram. The shape of a histogram illustrates a measure of predictability of ball movement over the set of play segments. A histogram 320 with a narrow distribution indicates that the ball travel is more predictable when starting from section 6 of the grid 220. A histogram 320 with a wide distribution indicates that the ball travel is less predictable when starting from section 6 of the grid 220.

The histogram map 330 graphically represents the histograms 320 for each section of the grid 220. The process described above is repeated for each section of the grid 220, resulting in a histogram diagramming predictability of ball movement from each starting position. For each set of play segments, a probability distribution is determined based on the occupancy for all the play segments which started in the corresponding section. Once the probability distributions are determined for each section, the entropy for each section may be calculated.

The entropy map 340 graphically depicts the measure of entropy for each section of the grid 220, where the ball position is in the given section at the beginning of a play segment.

The entropy or information content of a random discrete variable, X with a probability distribution $p(X)=(p_0, \ldots, p_{n-1})$ may be defined as:

$$H(X) = -\sum_{i=0}^{n-1} p(i) \log p(i)$$

Where 'i' is the section number, and "p(i)" is the probability calculated for the given section 'i,' as described above. The base of the logarithm determines the unit. For example, the base of the logarithm is two, the resulting entropy measure is expressed in a quantity of binary digits (bits). In the present context, entropy may be viewed as a measure of uncertainty or how predictable or unpredictable a team's patterns of play is for different sections on the grid 220. As such, the predictability of a team's behavior for each section on the grid 220 may be determined by calculating the entropy for each section. In other words, the entropy value for a given section may measure whether a team tends to exhibit the same ball movement behavior from a given starting position, or a more widely varied ball movement behavior. A high entropy value may correspond to a higher level of uncertainty in team behavior, and therefore more bits to represent and transfer information describing this behavior. A low entropy value may correspond to a lower level of uncertainty in team behavior, and therefore fewer bits to represent and transfer information describing this behavior. As further described below, color may be used to represent entropy values, where blues and light greens may represent a relatively low entropy value, and dark greens, yellows, and reds may represent higher entropy values.

Repeating this entropy map process for each team in a given league results in a set of entropy maps, where the entropy maps provide a means to quantify and visualize the predictability of a team's ball movement behavior from various starting positions on the soccer field 210.

It should be appreciated that the techniques described herein are sufficiently flexible to accommodate any technically feasible mapping approach based on one or more spatiotemporal properties, and are not restricted to entropy maps. In one example, mapping could be based on any metric, including, without limitation, mean position, median position, multiple means, frequency, or entropy. In another example, mapping could be based on any representation of conditional probability. Such a representation could be based on only the location information of a set of spatiotemporal data, only on temporal information of a set of spatiotemporal data, or on both location and temporal information. Motion information could be summarized at a particular location using conditional probability, such as, for a given starting location of a ball, predict the destination of the ball at a given future time. Such conditional probability could be estimated using a series of location-specific histograms. Spatiotemporal property maps could then be computed by considering various properties of the conditional property, where entropy represents one such property. In another example, mapping could be based on any representation of conditional probability, where the conditional probability is conditioned on more than one variable, such as the starting position of a ball and the ending position of the ball. In this manner, the predictability of a team's progression path could be measured as a function of play segments that start at a certain location and end at a certain location. Such a conditional probability would result in an entropy map or other spatiotemporal map of more than two dimensions. In another example, mapping could be based on a "heat map," in which the number of times the ball is in a given section of the soccer field 210 at the end of a play segment is counted, regardless of the starting position of the ball.

In addition, various criteria may be used to sort the play segments into subsets of play segments. For example, play segments could be sorted by any feasible technique, including, without limitation, the position of an object at the beginning of the play segment, the position of an object at the end of the play segment, or the position of a ball at any given point in the play segment, In another example, entropy maps could be created in the reverse temporal direction, where play segments are sorted by the ending position of the ball. The entropy maps then measure the variability of the ball position at the start of the play segments. In yet another example, the play segments could be filtered to include a subset of the available play segments. Such play segment subsets could be filtered based on various criteria, including, without limitation, a team is in a winning position relative to an opposing team (e.g. the team has a higher score or a more dominant field position), a team is in a losing position relative to an opposing team (e.g. the team has a lower score or a less dominant field position), the presence or absence of one or more key players, the presence or absence of a particular coach, or specific types of plays, such as passes or shots to the net. In another example, motion can be measured within any defined area, including, without limitation, a playing field, a theme park, or a wildlife preserve.

Characterizing Teams Using Entropy Maps

Figure 4:
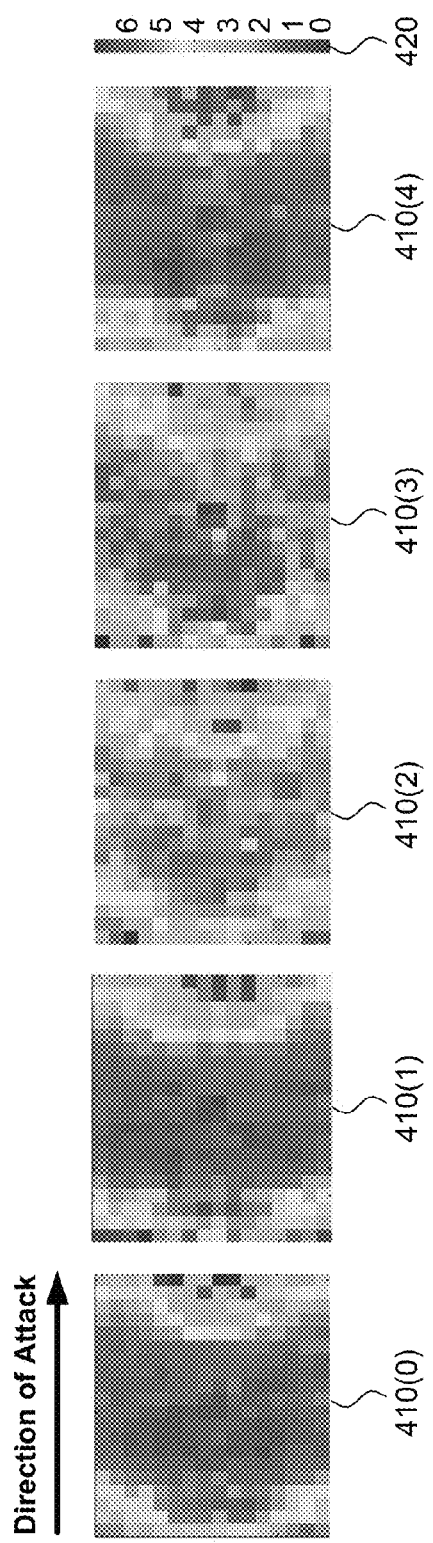
FIG. 4 illustrates entropy maps showing the characteristic ball movement for a set of five teams, according to one embodiment of the present invention.

FIG. 4 illustrates entropy maps 410 showing the characteristic ball movement for a set of five teams, according to one embodiment of the present invention. As shown, the entropy maps 410 also include a legend 420. The legend maps entropy values, calculated as described above, with color. Low entropy values (0-2) are associated with blue to light green color, mid-range entropy values (3-4) are associated with green to yellow color, and high entropy values (5-6) are associated with orange to red color.

The entropy maps 410 may be developed using data from any quanta of play, including, without limitation, a partial match, a single match, a group of matches, or an entire season of matches. The entropy maps 410 illustrate both a quantitative and a visual method of the predictability of a team from various sections of the soccer field 210. High entropy indicates a high level of unpredictability, which may, in turn, indicate a team with a higher level of skill.

The entropy maps 410(0)-410(4) illustrate exemplary entropy maps of five teams, where the teams are in rank order from left to right such that entropy map 410(0) is associated with the highest ranked team, and entropy map 410(4) is associated with the lowest ranked team. Generally, the entropy values around the goal area in the right-hand attacking end are low due to the number of players around the goal areas attempting to protect the goal. The entropy values are also low in the corner areas of the field as there are relatively few available options from these corner positions. The leftmost two entropy maps 410(0) 410(1) show heavy redness throughout the maps, indicating high entropy values, particularly throughout the center section of the soccer field 210. Such a pattern may indicate that the associated teams are passing teams, adept at moving the ball around the soccer field 210. Entropy map 410(0) has a more pronounced area of high entropy toward the right side of the soccer field 210, which could indicate strong players who concentrate on the right side of the soccer field 210. Entropy map 410(1) has a more pronounced area of high entropy toward the left side, which could indicate strong players who concentrate on the left side of the soccer field 210

The next two entropy maps 410(2) 410(3), the overall lower entropy values throughout the soccer field 210 indicate teams that may not play as expansive a passing game as the teams represented by entropy maps 410(0) 410(1). The rightmost entropy map 410(4) indicates a similar pattern to the teams represented by entropy maps 410(0) 410(1), but with lower entropy values on the left and right ends of the soccer field 210, indicating that the associated team may not utilize the width of the soccer field 210 as much.

Figure 5:
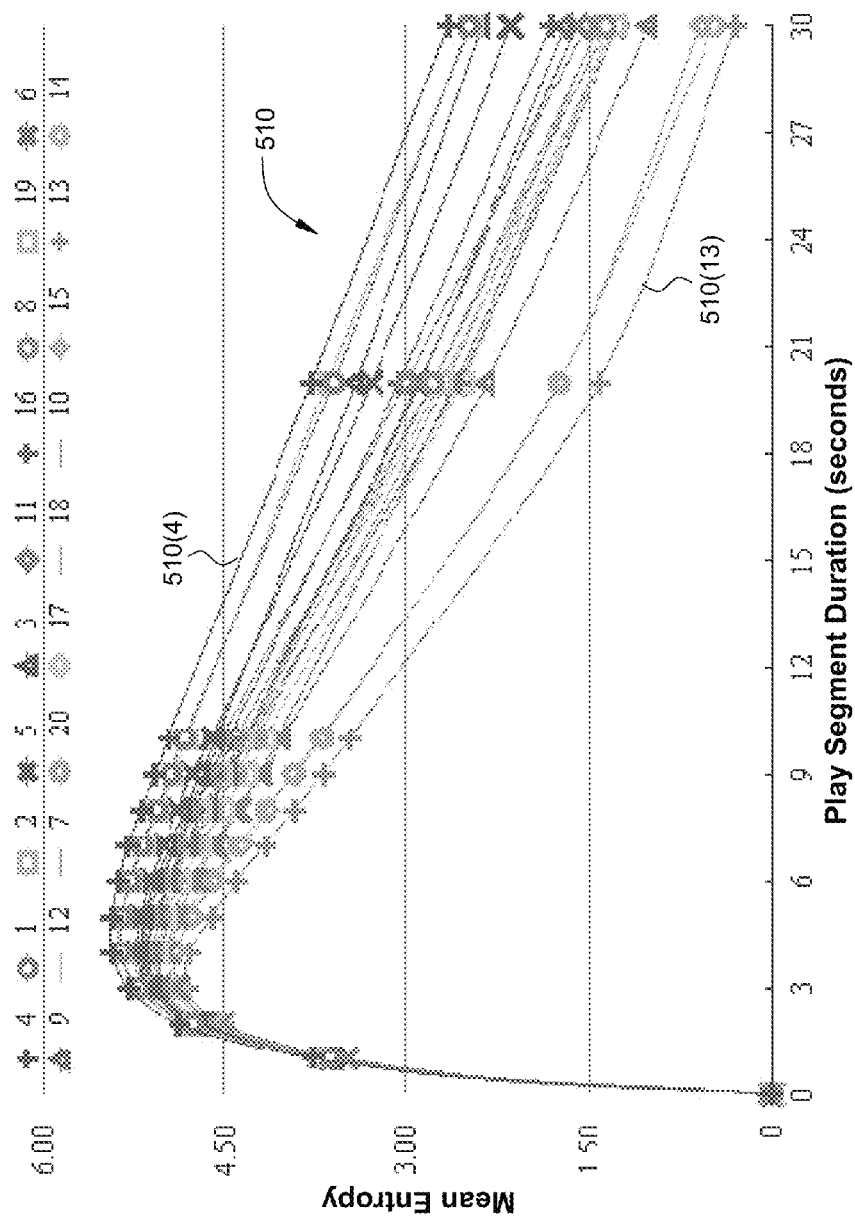
FIG. 5 illustrates a series of mean team entropies for a set of twenty teams using various play segment durations, according to one embodiment of the present invention.

FIG. 5 illustrates a series 510 of mean team entropies for a set of twenty teams using various play segment durations, according to one embodiment of the present invention. As shown, the series 510 also includes a legend 520, indicating which curve on the series 510 corresponds to each of the twenty teams shown in the legend 520. The team numbers shown in the legend 520 indicate the rank of each team where rank 1 is associated with the best team and rank 20 is associated with the worst team. The teams shown in the legend are presented roughly in order of decreasing meant team entropies. As such, team 4 is represented by curve 510(4) at the high end of the set of curves, while team 13 is represented by curve 510(13) at the low end of the set of curves. Other curves lie between these two curves 510(4) and 510 (13).

In the example mean entropy curves of FIG. 5, the top five ranked teams could have the highest mean entropies for varying play segment window lengths. For the remaining fifteen teams, team ranking could have little correspondence with mean entropy. As shown, the maximum entropy occurs at a time interval of approximately 4 to 5 seconds for all teams. At this time interval, the amount of information available to characterize team behavior. Entropy maps for one team versus another may be easier to distinguish at longer time intervals, where there is greater separation among the curves. However, the curves have lower overall mean entropy at these longer intervals, corresponding to a reduced amount of information which thereby reduces the discriminative power of the signal. By calculating and analyzing a set of mean entropy curves such as those depicted in FIG. 5, an optimal play segment time interval may be determined.

After an appropriate play segment time interval has been selected, and a set of entropy maps have been created, the entropy maps may be used to aid any technically feasible analysis techniques. In one embodiment, a technique is employed to identify variations in team behavior using historical entropy map data.

Identifying Team Behavior Variation

Figure 6:
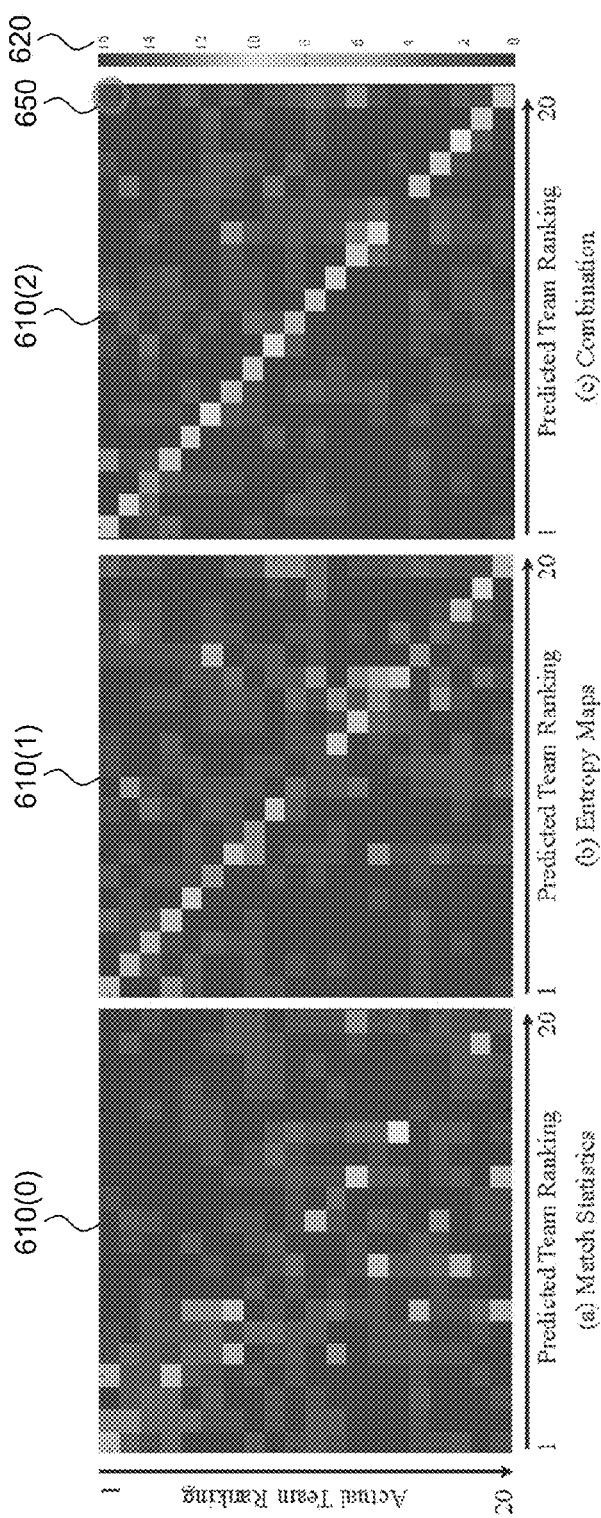
FIG. 6 illustrates a set of confusion matrices resulting from a team identification analysis, according to one embodiment of the present invention.

FIG. 6 illustrates a set of confusion matrices 610 resulting from a team identification analysis, according to one embodiment of the present invention. As shown, the set of confusion matrices 610 also includes a legend 620.

The confusion matrices 610 may be used to identify a correlation between a predicted value and an actual value, using any technically feasible input data. In the example of FIG. 6, historical data representing team behavior could be calculated over a set of soccer matches, where one match has been omitted. The resulting historical data could be compared against the data calculated for the omitted soccer match to predict the teams that likely played in the omitted soccer match. The predicted teams could then be compared with the actual teams that played the match. This process could then be repeated for each match in the set of matches, omitting one match at a time and comparing predicted versus actual results. For each step of this process, a confusion index may be calculated using any technically feasible means, such as by using k-Nearest Neighbor approach, where a high confusion index indicates a successful prediction and a low confusion index indicates an unsuccessful prediction. The input data may be scaled and subjected to linear discriminant analysis (LDA) to represent the results in a compact, data preserving representation. The predicted teams could then be plotted against the actual teams in order to produce the confusion matrices 610. Where teams are predicted with high accuracy, the resulting confusion matrix 610 would indicate a high confusion index on the axis where predicted team is equal to the actual team, and a low confusion index for locations not on the axis.

The legend 620 maps the confusion index to color, where a low confusion index is shown as blue colors and a high confusion index is shown as red colors.

In the example of FIG. 6, the confusion matrix 610(0) could be calculated using standard match statistics typically used in analysis, including, without limitation, the quantity of passes, shots, tackles, fouls, aerials, possessions, and the time in-play for each possession. The confusion matrix 610(1) could be calculated using entropy maps as described above. The confusion matrix 610(2) could be calculated using a combination of the entropy maps and match statistics. In this example, confusion matrix 610(0) would indicate low discriminative value where team predictions exhibit an accuracy of about 19%, versus approximately 5% where predicted teams are selected randomly. Confusion matrix 610(0) would indicate improved accuracy of approximately 30% accuracy, as indicated by a more clearly visible diagonal axis. Confusion matrix 610(2), using both match statistics and entropy maps, would indicate improved accuracy of approximately 47% accuracy.

Teams that exhibit similar styles of play, as exemplified in similar match statistics and entropy maps, may be confused with each other. In addition, if a team exhibits a style of play inconsistent with historical match statistics and entropy data, then this inconsistency may also be identified. Such an inconsistency may be indicated where predicted teams are not the same as actual teams for a given match. Location 650 of confusion matrix 610(2) represents one such example, as further described below.

Figure 7:
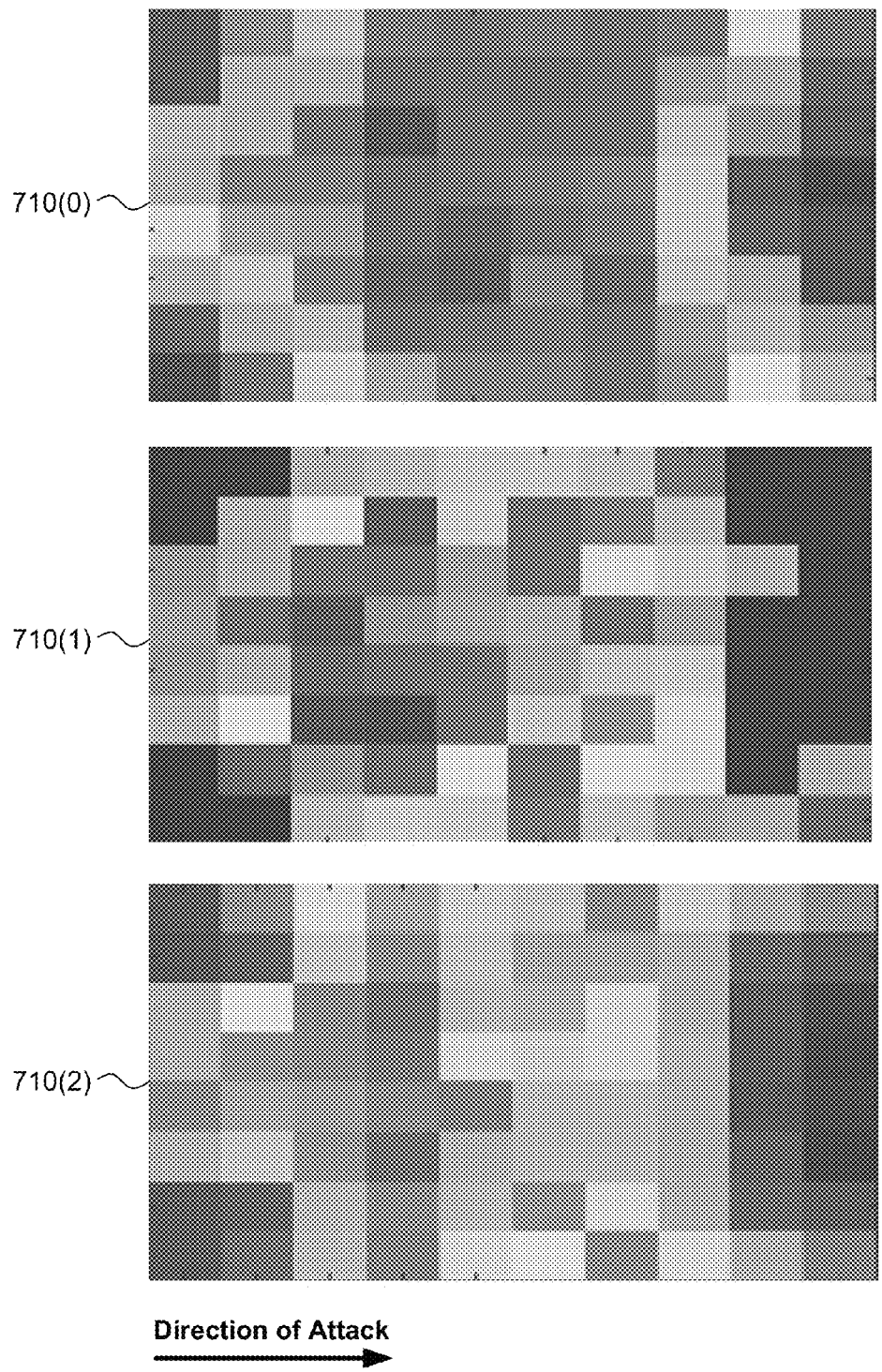
FIG. 7 illustrates a set of entropy maps depicting variant team behavior, according to one embodiment of the present invention.

FIG. 7 illustrates a set of entropy maps 710 depicting variant team behavior, according to one embodiment of the present invention.

In this example, a top ranked team was confused with a low ranked team. The entropy map 710(0) represents the historical entropy map of the top ranked team, while the entropy map 710(2) represents the historical entropy map of the low ranked team. The entropy map 710(1) represents the entropy map for the top ranked team in the match identified by location 650 of FIG. 6. The entropy map 710(1) bears a stronger resemblance to the entropy map 710(2) than to the entropy map 710(0), resulting in an incorrect prediction, indicating a variant team behavior during the particular match. By identifying matches where the predicted teams vary from the actual teams playing a match, analysts may better evaluate a team's behavior for the given match.

By using the approach described in conjunction with FIGS. 6 and 7, historical entropy maps for a set of teams could be calculated over a set of soccer matches. The resulting historical entropy maps could be used to compare against an entropy map calculated for a current soccer match. The resulting team prediction for the current soccer match could be compared with the actual teams playing the current soccer match to analyze the teams' behavior in the current soccer match. In other words, such a prediction or analysis may be helpful to determine whether a team's playing behavior during a particular match is consistent with behavior during prior matches, to determine whether a team's playing behavior varies depending on which team is on the opposing side, or to determine whether a team's behavior is influenced by the coaching staff or one or more specific key players.

Additional Analysis Applications

As described herein, identifying variations in team behavior is used as a reference example of analysis that may result from the disclosed techniques. However, other analysis applications may be employed within the scope of the present invention.

In one example, entropy maps could be used to select corresponding positions within a related entity, such as time code cue points within a video of the associated event or activity. The entropy maps could then be used to navigate through the related entity. A software application including a graphical user interface could present an entropy map related to a particular event or activity, such as one of the entropy maps 410 described in conjunction with FIG. 4. A user could select a section on the entropy map representing a relatively high entropy value, representing a period of low predictability. The software application would then cue one or more positions within the related video that correspond to the selected section. The user could select and play the video starting from the cued positions. Likewise, a user could select a section on the entropy map representing a relatively low entropy value, representing a period of high predictability. The software application would then cue one or more positions within the related video that correspond to the selected section. The user could select and play the video starting from the cued positions. The entropy maps could thus be used to cue a video playback device to specific points of interest in the event or activity.

In another example, entropy maps related to one set of events or activities could be compared and contrasted with a second set of events or activities. Entropy maps computed from matches associated with a current season could be compared and contrasted with entropy maps computed from matches associated with a prior season to observe changes in spatiotemporal properties from season to season. Likewise, entropy maps computed from matches associated with good weather conditions could be compared and contrasted with entropy maps computed from matches associated with inclement weather conditions to observe changes in spatiotemporal properties as a function of weather.

In another example, entropy maps related to motion data from specific players could be used to analyze the behavior of the specific players from various starting positions on the soccer field 210. Likewise, entropy maps for specific players could be compared and contrasted with entropy maps for the players' respective teams to analyze how key player behavior correlates to team behavior.

It should be appreciated that the architecture described herein is illustrative only and that variations and modifications are possible. For example, although described herein in conjunction with the game of soccer, the techniques could be used to analyze any sport, including sports that may not exhibit continuous play or low scoring. For example, the described techniques could be employed to analyze segmented sports such as American football or high scoring sports such as basketball. In another example, the described techniques could be employed to analyze objects of interest other than a ball, including, without limitation, a shuttle as used in badminton, a puck as used in hockey, or an arrow as used in archery. In yet another example, the techniques described herein could be used to analyze movement data related to any activity, whether or not in the context of a sport. Such activities could include, without limitation, movement of vehicles along a given road system, movement of kayaks along a river, movement of vessels through a waterway, movement of groups or individuals through a particular area, or movement of animals, such as predators and their prey, through a park. In such contexts, spatiotemporal data would not necessarily be based on possession of a ball, the time segments would not necessarily be considered to be "play segments." In yet another example, the techniques disclosed herein could be applied to individual sports in addition to team sports, including, without limitation, cycling, auto racing, and track and field events.

Figure 8:
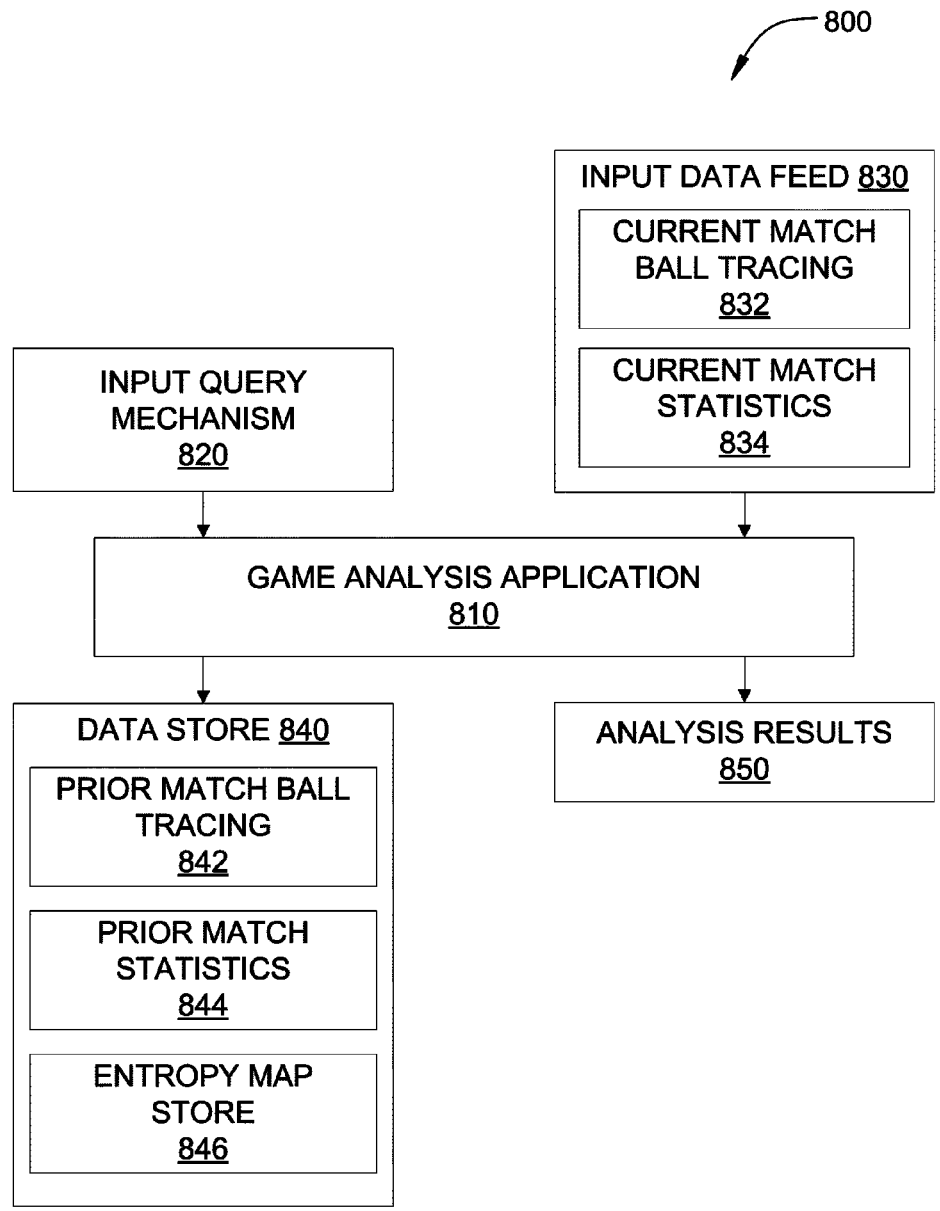
FIG. 8 illustrates a game analysis system as may be implemented on the computing system of FIG. 1, according to one embodiment of the present invention.

In yet another example, the techniques described herein used partial team tracking data in the form of ball movement data. However, the techniques similarly apply to other data sources, such as tracking data for key players, and similarly apply where full tracking data for the ball and all players could be available. In yet another example, the techniques described herein use specific fixed size grid patterns. However, the techniques equally apply to any technically feasible spatial segmentation. In yet another example, play segments are described using ten time steps where each time step is one second. However, the techniques equally apply to other play segment durations and time step durations. In yet another example, entropy is used as a measure of team behavior predictability. However, other technically feasible metrics may be used to predict team behavior within the scope of this invention. FIG. 8 illustrates a game analysis system 800 as may be implemented on the computing system 100 of FIG. 1, according to one embodiment of the present invention. As shown, the game analysis system 800 includes a game analysis application 810, an input query mechanism 820, an input data feed 830, a data store 840, and analysis results 850.

The game analysis application 810 is a software program including instructions that, when executed, performs the techniques described above in conjunction with FIGS. 2-7. The game analysis application 810 may reside in system memory 104 where the instructions of the software program may be retrieved and executed by the CPU 102.

The input query mechanism 820 receives one or more input queries, such as a request from a user, and transmits the query to the game analysis application 810. For example, the input query mechanism 820 could receive a query requesting that the input data feed 830 for the current match be analyzed in light of data from prior matches retrieved from the data store 840 in order to determine whether the style of play exhibited by the teams playing in the current match are similar to or different from the teams' style of play in prior matches. The input query mechanism 820 may provide data to the game analysis application 810 via one or more input devices 108.

The input data feed 830 provides information regarding the current match to the game analysis application 810. As shown, the input data feed 830 includes current match ball tracing 832 and current match statistics 834. The current match ball tracing 832 includes information regarding ball movement, including, without limitation, the position of the ball on the soccer field 210, timing information regarding the ball, the type of play being performed (such as a pass, tackle, or take on), and an indicator as to whether the play was successful. The data included in the current match ball tracing 832 may manually annotated by humans or machine generated by tracking systems. The current match statistics 834 includes standard match statistics typically used in analysis, including, without limitation, the quantity of passes, shots, tackles, fouls, aerials, possessions, and the time in-play for each possession. Of course, the particular statistics will correspond to the particular game being analyzed. The current match statistics 834 are typically updated throughout the match as play progresses. The input data feed 820 may also include other information, e.g. tracking data of one or more players on each team. The input data feed 830 may provide data to the game analysis application 810 via one or more input devices 108.

The data store 840 provides information regarding the prior matches to the game analysis application 810. As shown, the data store 840 includes prior match ball tracing 842, prior match statistics 844, and an entropy map store 846. The prior match ball tracing 842 includes information from prior matches regarding ball movement, including, without limitation, the position of the ball on the soccer field 210, timing information regarding the ball, the type of play being performed (such as a pass, tackle, or take on), and an indicator as to whether the play was successful. The prior match statistics 844 include standard match statistics for prior matches typically used in analysis, including, without limitation, the quantity of passes, shots, tackles, fouls, aerials, possessions, and the time in-play for each possession. The entropy map store 846 includes pre-processed entropy maps as calculated by the game analysis application 810. In one example, the game analysis application 810 could pre-calculate entropy maps based on a league's matches for the current season from the first match until the current match. These entropy maps could be calculated using the prior match ball tracing 842 and the prior match statistics 844 as inputs. The game analysis application 810 could then calculate the entropy map for the current match and update the current match entropy map as the game progresses. The current match entropy maps could be calculated using the current match ball tracing 832 and the current match statistics 834 as inputs. The game analysis application 810 could then compare the current match entropy maps against the pre-calculated entropy maps in the entropy map store 846. The game analysis application 810 could then determine which entropy map within the entropy map store 846 most closely resembles the entropy maps for the current match. The data store 840 may also include other information for prior matches, e.g. tracking data of one or more players on each team. The data store 840 may be located within the system disk 114.

The analysis results 850 represent the results of the analysis performed by the game analysis application 810. For example, the game analysis application 810 could determine which entropy map within the entropy map store 846 most closely resembles the entropy maps for the current match, as described above. The game analysis application 810 could then provide the entropy maps for the current game and the most closely matching maps within the entropy map store 846, along with the identification of the teams, as analysis results 850. The analysis results 850 may be transmitted to the display processor 112 for presentation on the display device 110.

Figure 9:
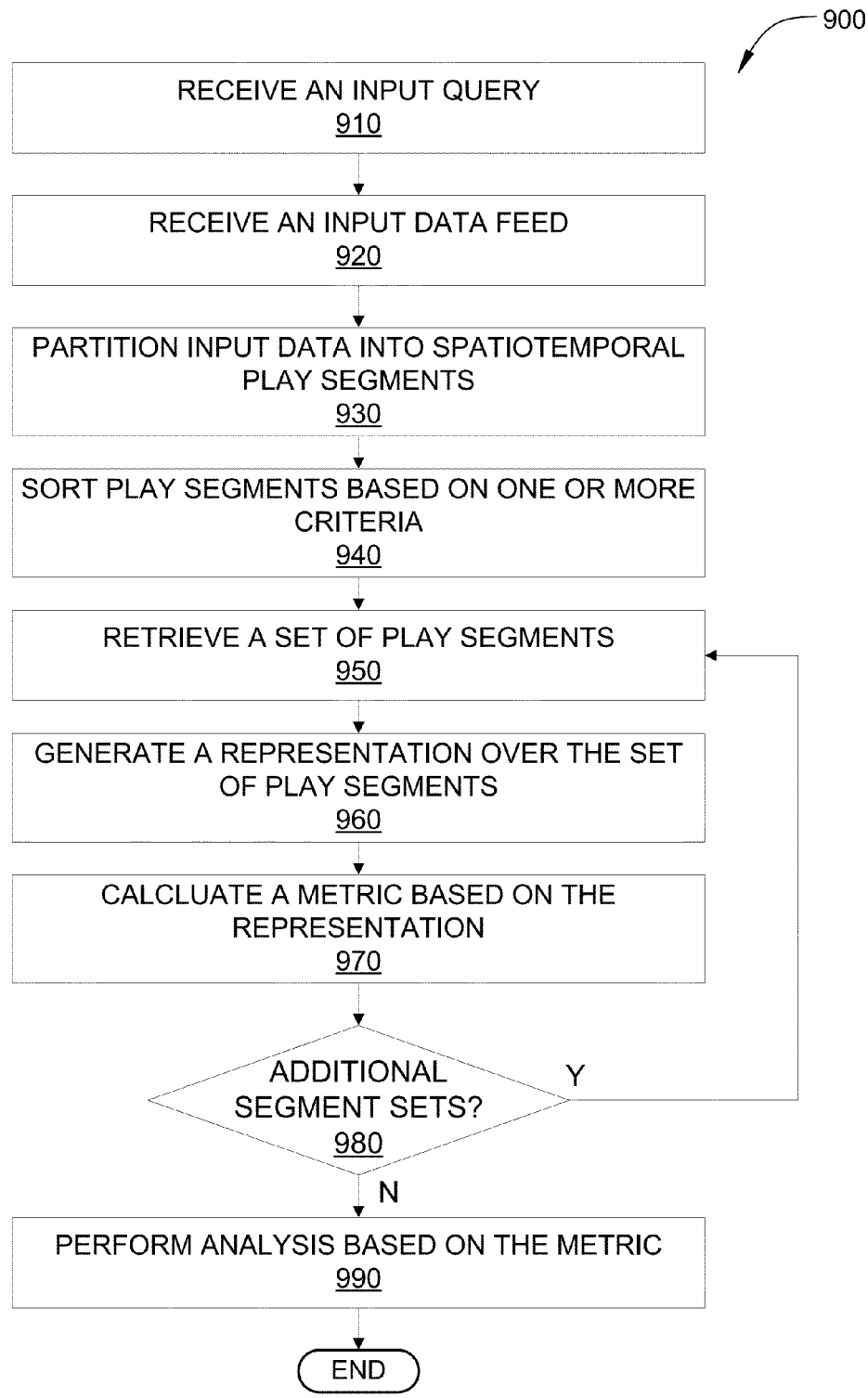
FIG. 9 illustrates a method for characterizing multi-agent team behavior, according to one embodiment of the present invention.

FIG. 9 illustrates a method 900 for characterizing multi-agent team behavior, according to one embodiment of the present invention. Although the method steps are described in conjunction with FIGS. 1-8, persons skilled in the art will understand that any system configured to perform the method steps, in any order, falls within the scope of the present invention.

The method 900 begins at step 910, where the game analysis system 800 receives an input query. For example, the game analysis system 800 may receive a query to identify the teams playing a specific soccer match. At step 920, the game analysis system 800 receives an input data feed. For example, the game analysis system 800 may receive a set of ball or player movements associated with the specific soccer match. In addition, the game analysis system 800 may receive a set of match statistics associated with the specific soccer match and standard match statistics for a set of prior soccer matches involving, e.g., the teams playing the current soccer match and other teams playing within the same league. For example, such standard match statistics could include, without limitation, the quantity of passes, shots, tackles, fouls, aerials, possessions, and the time in-play for each possession. The game analysis system 800 may also receive a set of ball or player movements associated with a set of prior soccer matches. Alternatively, the game analysis system 800 may receive processed data, such as entropy maps resulting from analysis of ball or player movements and standard match statistics from a set of prior soccer matches. At step 930, the game analysis system 800 partitions the input data into spatiotemporal play segments. For example, the set of ball or player movements may be used to determine possession strings which in turn may be used to create play segments of equal duration. At step 940, the game analysis system 800 sorts the play segments into sets of play segments according to one or more criteria. For example, the game analysis system 800 could sort the play segments into sets based on the starting position of the ball as specified by the section number on the grid 220.

At step 950, the game analysis system 800 retrieves a set of play segments as sorted in step 940. At step 960, the game analysis system 800 generates a representation, such as a conditional probabilistic distribution, over the play segments within the set of play segments. For example, the game analysis system 800 could calculate a probability distribution in the form of a histogram for the set of play segments. At step 970, the game analysis system 800 calculates a metric based on the representation. For example, the game analysis system 800 could calculate an entropy value based on the histogram. At step 980, the game analysis system 800 determines whether additional play segment sets have yet to be processed. If there are additional play segment sets, then the method 900 proceeds to step 960, described above. If, at step 980, there are no additional play segments, then at step 990 the game analysis system 800 performs an analysis based on the metric calculated across the sets of play segments. For example, the game analysis system 800 may compare entropy values for the specific soccer match against the entropy values for a set of prior soccer matches in order to predict which teams are playing in the specific soccer match. Alternatively, the game analysis system 800 may use both the entropy values and the set of standard match statistics in order to predict which teams are playing in the specific soccer match. In one embodiment, the game analysis system 800 may compare the predicted teams playing the specific soccer match versus the actual teams in order to characterize how a team's playing style during the specific soccer match compares with or is in contrast to the team's historical behavior. The method 900 then terminates.

In sum, techniques are described to characterize team behavior by grouping partial tracing data into play segments, where play segments are spatiotemporal descriptions of ball movement over fixed windows of time. Using these play segment representations, team behavior is characterized via entropy maps, where such entropy maps measure the predictability of team behaviors across the field. The technique does not utilize a pre-defined library of plays and does not need full tracing of all player and ball movements in order to create the entropy maps. Teams may be characterized via the entropy maps, and various analysis techniques may be employed using the entropy maps. For example, the entropy maps may be used to detect team style variation through team identification analysis. In another example, this approach may be used to characterize team behaviors under certain conditions such as goal-scoring scenarios. In addition, partial tracing data, such as ball movements, may be created using an inexpensive input device, such as a tablet computer, in order to make the disclosed techniques available for amateur and semiprofessional sports domains. Characterizing team behavior via entropy maps may be helpful to determine whether a team's playing behavior during a particular match is consistent with behavior during prior matches, to determine whether a team's playing behavior varies depending on which team is on the opposing side, or to determine whether a team's behavior is influenced by the coaching staff or one or more specific key players.

Those skilled in the art will recognize that described systems, devices, components, methods, or algorithms may be implemented using a variety of configurations or steps. No single example described above constitutes a limiting configuration or number of steps. For example, configurations of the system shown in FIG. 1 exist in which the described examples of components therein may be implemented as electronic hardware, computer software, or a combination of both. Illustrative examples have been described above in general terms of functionality. More or fewer components or steps may be implemented without deviating from the scope of this disclosure. Those skilled in the art will realize varying ways for implementing the described functionality, but such implementation should not be interpreted as a departure from the scope of this disclosure.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method to characterize motion patterns of a first group of players engaged in a sporting activity, without requiring spatial information pertaining to any player, the computer-implemented method comprising:
   receiving spatial and temporal information pertaining to a physical object in a physical playing field of the sporting activity, the sporting activity having a scoring scheme based on manipulation of the physical object in the physical playing field;
   partitioning the spatial and temporal information into a plurality of spatiotemporal segments by operation of one or more computer processors, wherein each spatiotemporal segment comprises spatial and temporal information representing associated positions of the physical object in the physical playing field;
   generating one or more representations of one or more sets of segments of the plurality of spatiotemporal segments, based on one or more specified criteria; and
   computing, based on each of the one or more representations, a respective performance metric of the first group of players in the sporting activity, whereafter the respective performance metric is output and characterizes motion patterns of the first group of players based on spatial information pertaining to the physical object in the physical playing field and without requiring spatial information pertaining to any player.

2. The computer-implemented method of claim 1, wherein the one or more representations comprise a probability distribution indicating a quantity of times the physical object passes through a specified region of the playing field for a given position associated with the physical object.

3. The computer-implemented method of claim 1, wherein the performance metric measures an entropy value associated with the one or more representations.

4. The computer-implemented method of claim 1, wherein partitioning comprises:
   separating the spatial and temporal information into a group of possession strings, wherein each possession string is associated with a time interval when the first group of players was in a winning position relative to a second group of players and according to the scoring scheme.

5. The computer-implemented method of claim 1, wherein partitioning comprises:
   separating the spatial and temporal information into a group of possession strings, wherein each possession string comprises a different set of time steps from a plurality of time steps during the sporting activity, wherein each possession string is associated with a time interval when the first group of players had possession of the physical object;
   populating each time step with a position of the physical object at the associated time step; and
   extracting one or more spatiotemporal segments from each possession string, wherein the one or more spatiotemporal segments are included in the plurality of spatiotemporal segments.

6. The computer-implemented method of claim 5, wherein each time step in the set of time steps is of equal duration.

7. The computer-implemented method of claim 5, wherein the time steps in each segment of the one or more segments are sequential.

8. The computer-implemented method of claim 1, further comprising performing an analysis based on the performance metric.

9. The computer-implemented method of claim 8, further comprising receiving a query associated with the sporting activity, wherein the analysis is performed responsive to the query.

10. The computer-implemented method of claim 1, further comprising modifying the performance metric based on one or more statistics associated with the sporting activity.

11. The computer-implemented method of claim 1, wherein the spatial and temporal information further pertains to a plurality of time steps during the sporting activity, wherein the spatial and temporal information is partitioned into the plurality of spatiotemporal segments using a sliding window;

wherein each spatiotemporal segment in the plurality of spatiotemporal segments has a predefined first time duration of the sliding window, wherein the time period of each spatiotemporal segment overlaps the time periods of one or more other spatiotemporal segments;

wherein each spatiotemporal segment comprises spatial and temporal information representing associated positions of the physical object in the physical playing field, from an equal number of the time steps which when grouped together sum to the predefined first time duration.

12. The computer-implemented method of claim 11, wherein the sporting activity comprises a team-based, continuous, non-discretizable sporting activity, wherein the first group comprises a first of two teams involved in the sporting activity, wherein each group comprises a respective team, wherein the physical object is selected from a ball, a puck, and a shuttle;

wherein the physical object is a ball, wherein one or more performance measurements, which include the respective performance measurement of each of the one or more representations, specifies: (i) whether the team's performance during a particular match is consistent with performance during prior matches; (ii) whether the team's play varies depending on which team is on the opposing side; (iii) whether the behavior is influenced by coaching staff; and (iv) whether the behavior is influenced by one or more key players.

13. The computer-implemented method of claim 12, wherein the one or more representations comprise a probability distribution indicating a quantity of times the physical object passes through a specified region of the playing field for a given position associated with the physical object, wherein the performance metric measures an entropy value associated with the one or more representations.

14. The computer-implemented method of claim 13, wherein partitioning comprises, in a first instance:

separating the spatial and temporal information into a group of possession strings, wherein each possession string is associated with a time interval when the first group of players was in a winning position relative to a second group of players and according to the scoring scheme.

15. The computer-implemented method of claim 14, wherein partitioning comprises, in a second instance:

separating the spatial and temporal information into a group of possession strings, wherein each possession string comprises a different set of time steps from the plurality of time steps, wherein each possession string is associated with a time interval when the first group of players had possession of the physical object;

populating each time step with a position of the physical object at the associated time step; and extracting one or more spatiotemporal segments from each possession string, wherein the one or more spatiotemporal segments are included in the plurality of spatiotemporal segments.

16. The computer-implemented method of claim 15, wherein the sporting activity comprises soccer, wherein the ball is a soccer ball, wherein each time step in the set of time steps is of equal duration, wherein the time steps in each segment of the one or more segments are sequential, wherein the computer-implemented method further comprises:

modifying the performance metric based on one or more statistics associated with the sporting activity;

receiving an input query associated with the sporting activity;

responsive to the input query, performing an analysis based on the performance metric; and generating a visual representation based on the analysis, whereafter the visual representation is output.

17. A non-transitory computer-readable medium including instructions executable to perform an operation to characterize motion patterns of a first group of players engaged in a sporting activity, without requiring spatial information pertaining to any player, the operation comprising:

receiving spatial and temporal information pertaining to a physical object in a physical playing field of the sporting activity, the sporting activity having a scoring scheme based on manipulation of the physical object in the physical playing field;

partitioning the spatial and temporal information into a plurality of spatiotemporal segments by operation of one or more computer processors when executing the instructions, wherein each spatiotemporal segment comprises spatial and temporal information representing associated positions of the physical object in the physical playing field;

generating one or more representations of one or more sets of segments of the plurality of spatiotemporal segments, based on one or more specified criteria; and computing, based on each of the one or more representations, a respective performance metric of the first group of players in the sporting activity, whereafter the respective performance metric is output and characterizes motion patterns of the first group of players based on spatial information pertaining to the physical object in the physical playing field and without requiring spatial information pertaining to any player.

18. The non-transitory computer-readable medium of claim 17, wherein partitioning comprises:

separating the spatial and temporal information into a group of possession strings, wherein each possession string is associated with a time interval when the first group of players was in a winning position relative to a second group of players and according to the scoring scheme.

19. The non-transitory computer-readable medium of claim 17, wherein partitioning comprises:

separating the spatial and temporal information into a group of possession strings, wherein each possession string comprises a different set of time steps from a plurality of time steps during the sporting activity, wherein each possession string is associated with a time interval when the first group of players had possession of the physical object;

populating each time step with a position of the physical object at the associated time step; and extracting one or more spatiotemporal segments from each possession string, wherein the one or more spatiotemporal segments are included in the plurality of spatiotemporal segments.

20. A computer-implemented method for analyzing motion patterns of a first group of players engaged in a sporting activity, wherein the motion patterns are characterized without requiring spatial information pertaining to any player, the computer-implemented method comprising:

receiving a plurality of performance metrics of the first group of players and which characterize motion patterns of the first group of players based on spatial information pertaining to a physical object in a physical playing field of the sporting activity and without requiring spatial information pertaining to any player, the sporting activity having a scoring scheme based on manipulation of the physical object in the physical playing field, the performance metrics having been computed from one or more representations of a set of spatiotemporal segments partitioned based on the spatiotemporal information, wherein each spatiotemporal segment comprises spatial and temporal information representing associated positions of the physical object in the physical playing field and at which one or more of the players are located;

performing an analysis by operation of one or more computer processors and in response to an input query, wherein the analysis is based on the plurality of performance metrics; and generating a visual representation based on the analysis, whereafter the visual representation is output.

* * * * *